United States Patent
Wang et al.

(10) Patent No.: US 10,366,290 B2
(45) Date of Patent: Jul. 30, 2019

(54) SYSTEM AND METHOD FOR PROVIDING AUGMENTED VIRTUAL REALITY CONTENT IN AUTONOMOUS VEHICLES

(71) Applicant: Baidu USA LLC, Sunnyvale, CA (US)

(72) Inventors: Quan Wang, San Jose, CA (US); Biao Ma, San Jose, CA (US); Shaoshan Liu, Sunnyvale, CA (US); James Peng, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 21 days.

(21) Appl. No.: 15/152,015

(22) Filed: May 11, 2016

(65) Prior Publication Data
US 2017/0330034 A1 Nov. 16, 2017

(51) Int. Cl.
G05D 1/02 (2006.01)
G05D 1/00 (2006.01)
G01C 21/34 (2006.01)
G06F 3/0488 (2013.01)
G06K 9/00 (2006.01)
G06F 3/00 (2006.01)
G06T 19/00 (2011.01)
(Continued)

(52) U.S. Cl.
CPC ......... *G06K 9/00671* (2013.01); *B60W 50/00* (2013.01); *G05D 1/0088* (2013.01); *G06F 3/005* (2013.01); *G06K 9/00791* (2013.01); *G06T 19/006* (2013.01); *H04L 67/12* (2013.01); *H04L 67/18* (2013.01); *H04L 67/306* (2013.01); *H04L 67/38* (2013.01)

(58) Field of Classification Search
CPC .................................................. G06T 19/006

USPC ......................................................... 345/633
See application file for complete search history.

(56) References Cited

U.S. PATENT DOCUMENTS 9,366,862 B2 * 6/2016 Haddick ............ G02B 27/0093
9,571,819 B1 * 2/2017 Barron ................. H04N 13/128
(Continued)

FOREIGN PATENT DOCUMENTS

JP    2001312285 A    11/2001
JP    2014182479 A    9/2014
(Continued)

OTHER PUBLICATIONS

Nguyen et al., Virtual Reality Interfaces for Visualization and Control of Remote Vehicles;Autonomous Robots 11, 59-68, 2001.*

*Primary Examiner* — Javid A Amini
(74) *Attorney, Agent, or Firm* — Womble Bond Dickinson (US) LLP

(57) ABSTRACT

In one embodiment, a server receives a request from a first autonomous vehicle for content delivery. In response to the request, a vision analysis is performed on an image obtained from the request to determine three-dimensional (3D) positioning information of the image. A list of content items are identified based on current vehicle information of the first autonomous vehicle in view of a user profile of a user ridding the first autonomous vehicle. A first content item selected from the list of content items is augmented onto the image based on the 3D positioning information of the image, generating an augmented image. The augmented image is transmitted to the first autonomous vehicle, where the augmented image is to be displayed on a display device within the autonomous vehicle in a virtual reality manner.

25 Claims, 7 Drawing Sheets

(51) Int. Cl.
*H04L 29/08* (2006.01)
*H04L 29/06* (2006.01)
*B60W 50/00* (2006.01)

(56) References Cited

U.S. PATENT DOCUMENTS

| | | | |
|---|---|---|---|
| 9,736,451 B1* | 8/2017 | Barron | H04N 13/128 |
| 9,767,613 B1* | 9/2017 | Bedikian | G06T 19/006 |
| 2005/0222752 A1 | 10/2005 | Sokola et al. | |
| 2009/0109240 A1* | 4/2009 | Englert | G06T 19/006 |
| | | | 345/633 |
| 2010/0098295 A1* | 4/2010 | Zhang | G06K 9/00798 |
| | | | 382/103 |
| 2010/0158310 A1* | 6/2010 | McQueen | G06K 9/00 |
| | | | 382/100 |
| 2013/0158778 A1 | 6/2013 | Tengler et al. | |
| 2013/0162632 A1* | 6/2013 | Varga | G06T 19/006 |
| | | | 345/419 |
| 2014/0152698 A1* | 6/2014 | Kim | G06T 19/006 |
| | | | 345/633 |
| 2014/0297220 A1* | 10/2014 | Raffa | B60N 2/002 |
| | | | 702/150 |
| 2015/0109329 A1* | 4/2015 | Park | G06T 11/00 |
| | | | 345/629 |
| 2015/0109334 A1* | 4/2015 | Park | G06T 11/60 |
| | | | 345/633 |
| 2015/0123966 A1* | 5/2015 | Newman | G06T 19/006 |
| | | | 345/419 |
| 2015/0312773 A1* | 10/2015 | Joshi | H04W 16/18 |
| | | | 370/252 |
| 2015/0348112 A1* | 12/2015 | Ramanujam | G06Q 30/0266 |
| | | | 705/14.63 |
| 2015/0362733 A1* | 12/2015 | Spivack | A63F 13/26 |
| | | | 345/633 |
| 2016/0065903 A1* | 3/2016 | Wang | B60R 11/04 |
| | | | 348/148 |
| 2016/0070109 A1* | 3/2016 | Mullins | G02B 27/0176 |
| | | | 359/630 |
| 2016/0140842 A1* | 5/2016 | Park | G08G 1/0112 |
| | | | 340/905 |
| 2016/0342782 A1* | 11/2016 | Mullins | G06F 21/32 |
| 2017/0008521 A1* | 1/2017 | Braunstein | G01C 21/32 |
| 2017/0076603 A1* | 3/2017 | Bostick | G08G 1/143 |
| 2017/0115742 A1* | 4/2017 | Xing | G06F 3/012 |
| 2017/0142405 A1* | 5/2017 | Shors | H04N 13/0207 |
| 2017/0213165 A1* | 7/2017 | Stauffer | G06Q 10/02 |
| 2017/0214980 A1* | 7/2017 | Nadler | H04N 21/812 |
| 2017/0236337 A1* | 8/2017 | Devries | G06T 19/20 |
| | | | 345/419 |
| 2017/0270362 A1* | 9/2017 | Barnehama | G06K 9/00671 |
| 2018/0203455 A1* | 7/2018 | Cronin | G05D 1/02 |

FOREIGN PATENT DOCUMENTS

| | | |
|---|---|---|
| JP | 2015191355 A | 11/2015 |
| JP | 2016509318 A | 3/2016 |
| KR | 20070006825 A | 1/2007 |
| KR | 101592788 B1 | 2/2016 |
| WO | 2015/102834 A1 | 7/2015 |

* cited by examiner

SYSTEM AND METHOD FOR PROVIDING AUGMENTED VIRTUAL REALITY CONTENT IN AUTONOMOUS VEHICLES

FIELD OF THE INVENTION

Embodiments of the present invention relate generally to content searching and delivery. More particularly, embodiments of the invention relate to content searching and delivery in an autonomous vehicle.

BACKGROUND

Vehicles operating in an autonomous mode (e.g., driverless or self-driving) can relieve occupants, especially the driver, from some driving-related responsibilities. When operating in an autonomous mode, the vehicle can navigate to various locations using onboard sensors, allowing the vehicle to travel with minimal human interaction or in some cases without any passengers. Thus, autonomous vehicles give passengers, especially the person who would otherwise be driving the vehicle, the opportunity to do other things while travelling. Instead of concentrating on numerous driving-related responsibilities, the driver together with other passengers may be free to watch movies or other media content, while riding in an autonomous vehicle.

The excitement of ridding an autonomous vehicle typically only lasts a short period of time even for the first ride and afterward it quickly becomes an incredibly boring experience. Additionally, the practical future of autonomous vehicles is likely to be based on shared economy at least for the early stage. Therefore instead of just a few, there could be quite a number of boring passengers per vehicle.

However, conventional content delivery or entertainment systems in an autonomous vehicle typically provide static content to users without considering real-time traffic environment in which the autonomous vehicle is operating. The delivered content may or may not be interesting to the user ridding the autonomous vehicle.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
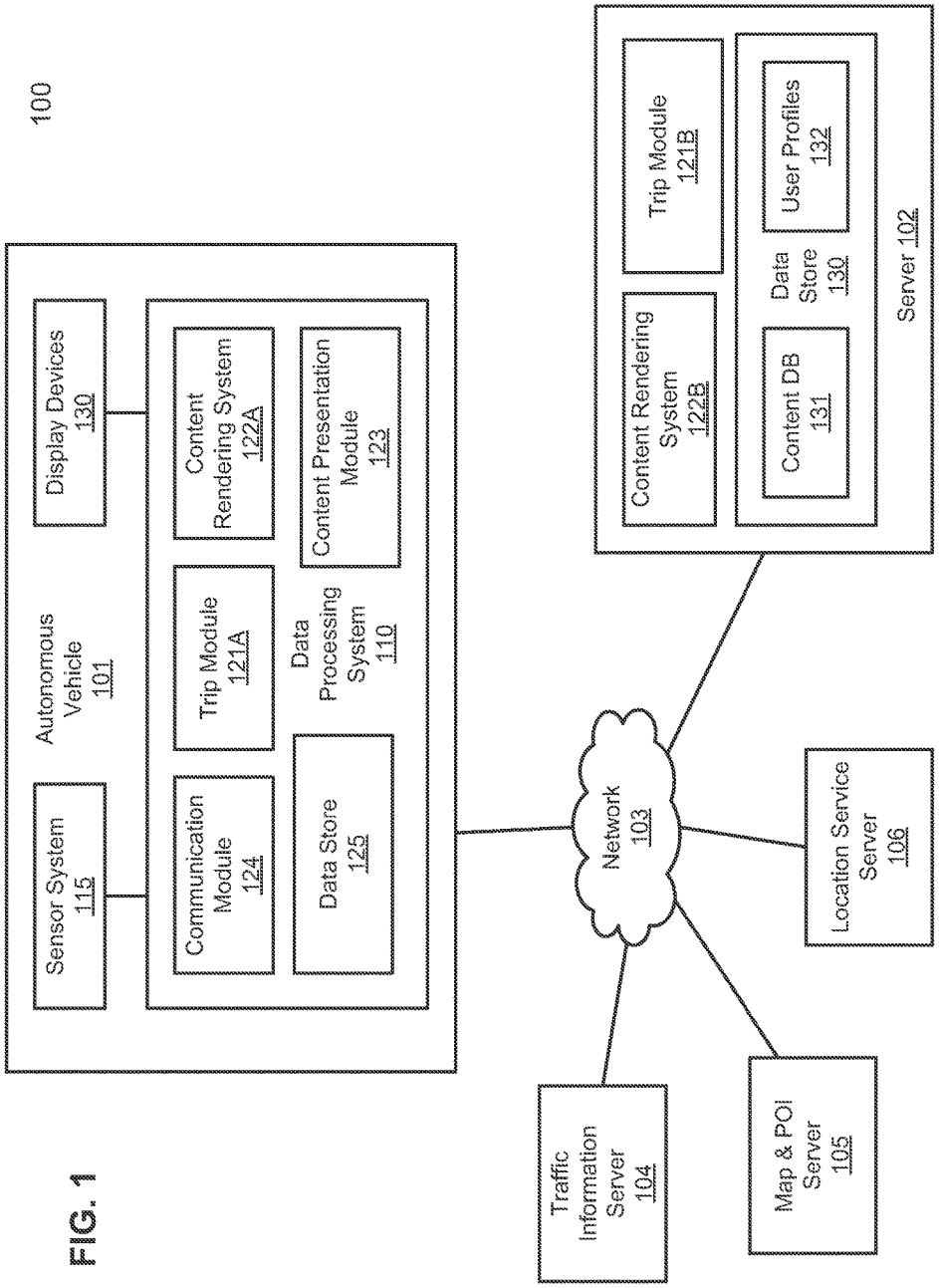
FIG. 1 is a block diagram illustrating a networked system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, an in-vehicle information and entertainment system is utilized to provide content suitable to be presented within an autonomous vehicle in a virtual reality (VR) manner. The content may be identified and rendered based on autonomous vehicles passenger's information (e.g. navigation, recommendation) and entertainment (e.g. learning and gaming) applications, combining augmented and/or virtual reality with cloud rendering and streaming, focusing on its usability in autonomous driving context.

According to one aspect of the invention, a server (e.g., a cloud server) receives a request from a first autonomous vehicle for content delivery. In response to the request, a vision analysis is performed on an image obtained from the request to determine three-dimensional (3D) positioning information of the image. A list of content items is identified based on current vehicle information of the first autonomous vehicle in view of a user profile of a user ridding the first autonomous vehicle. A first content item selected from the list of content items is augmented onto the image based on the 3D positioning information of the image, generating an augmented image. The augmented image is transmitted to the first autonomous vehicle, where the augmented image is to be displayed on a display device within the autonomous vehicle in a virtual reality manner.

The augmented image may be one of many augmented images in a stream (e.g., augmented video stream) that is streamed from the server to the autonomous vehicle. The server may be configured to provide information and entertainment content to a number of autonomous vehicles that are communicatively coupled to the server over a network (e.g., cloud network). The vehicle information may include a speed and moving direction, location and route information, map and point of interest (MPOI), and/or real-time traffic information associated with the autonomous vehicle. The vehicle information may be periodically received from a variety of data sources and from the autonomous vehicle. The content items may be identified based on a user profile of a user and the vehicle information at the point in time.

According to another aspect of the invention, an autonomous vehicle transmits a request to a cloud server over a network for media content, where the request includes a vehicle identifier (ID) of an autonomous vehicle and a user identifier (ID) identifying a user riding the autonomous vehicle. A first stream of media content and a second stream of media content are streamed from the cloud server, where the first stream and the second stream of media content were rendered by the cloud server. The first stream media content is presented on a first display device, where the first display device is configured and mounted at a first position resembling a first window of the autonomous vehicle. The second stream media content is presented on a second display device, wherein the second display device is configured and mounted at a second position resembling a second window of the autonomous vehicle.

FIG. 1 is a block diagram illustrating a network configuration according to one embodiment of the invention. Referring to FIG. 1, network configuration 100 includes an autonomous vehicle communicatively coupled to a centralized server 102 over a network 103. Although there is one autonomous vehicle shown, multiple autonomous vehicles can be coupled to and managed by server 102 over network 103. Each of the autonomous vehicles may have the same or similar infrastructure as of autonomous vehicle 101. Network 103 may be any type of networks such as a local area network (LAN), a wide area network (WAN) such as the Internet, a cellular network, a satellite network, or a combination thereof, wired or wireless. Server 102 may be any kind of servers or a cluster of servers, such as Web or cloud servers, application servers, backend servers, or a combination thereof.

In one embodiment, autonomous vehicle 101 includes, but is not limited to, sensor system 115 and data processing system 110. Sensor system 115 includes a variety of sensors or sensing devices that are required in order to enable autonomous vehicle 101 to navigate various roads and places under various situations. For example, sensor system 115 may include one or more cameras, a microphone, a global positioning system (GPS), an internal measurement unit (IMU), a radar system, and/or a light detection and range (LIDAR) system. Data processing system 110 is communicatively coupled to sensor system 115, for example, via a bus, an interconnect, or a network. Data processing system 110 is operable to process any data received from sensor system 115 and to manage or control sensor system 115. Data processing system 110 may be a dedicated computer equipped with necessary software and hardware to process information received from sensor system 115 and to control and drive autonomous vehicle 101.

In one embodiment, data processing system 110 includes, but is not limited to, trip module 121A, content rendering system 122A, content presentation module 123, communication module 124, and data store 125. Modules 121A-124 may be implemented in software, hardware, or a combination thereof. For example, modules 121A-124 may be loaded into a system memory and executed by one or more processors of data processing system 110. Trip module 121 manages any data related to a trip of a user. A user may log in and specify a starting location and a destination of a trip, for example, via a user interface. Trip module 121A communicates with other components of autonomous vehicle 101 to obtain the trip related data. For example, trip module 121 may obtain location and route information from location server 106 and map and POI (MPOI) server 105. Location server 106 provides location services and MPOI server 105 provides map services and the POIs of certain locations. During traveling of autonomous vehicle 101 along the route, trip module 121A may also obtain real-time traffic information from traffic information system or server (TIS) 104. Note that servers 104-106 may be operated by a third party entity. Alternatively, the functionalities of servers 104-106 may be integrated with server 102. These kinds of information may be analyzed and transmitted by trip module 121A to server 102 over network 103.

Data store 125 may be maintained in a persistent storage device (e.g., a non-volatile storage device such as a hard disk) storing a variety of data including, but not limited to, a content database (e.g., multimedia content), a user profile, trip related information (e.g., location and route information, POIs information). Data stored in data store 125 may be obtained from a variety of data sources, such as, server 102, traffic information server 104, map and POI server 105, and location server 106. For example, content data and user profiles may be provided by and cached from content database 131 and user profiles 132 of data store 130 of server 102. Data processing system 110 further includes other components, such as one or more processors (e.g., central processing units or CPUs), a system memory, or a communication interface (e.g., wireless communication interface), etc.

Content rendering system 122A is to perform local content rendering operations, for example, on content stored in data store 125. In one embodiment, content rendering system 122A renders the content into virtual reality content that can be presented by content presentation module 123 on one or more display devices of autonomous vehicle 101 in a virtual reality manner. For example, the windows of autonomous vehicle 101 may be configured as virtual windows, replaced by display devices shaped or curved into the ordinary shapes of actual vehicle windows. A user watches content displayed on a display device as if the user was watching through a see-through window. As another example, the virtual and/or augmented reality content could be customized privately and delivered separately to each passenger's headset for a tailored and immersive user experience.

The displayed content can be images or video captured by one or more cameras of autonomous vehicle 101 at real-time, representing the actual physical surroundings of autonomous vehicle 101. Alternatively, the displayed content can be other content that is completely different or unrelated to the surroundings of autonomous vehicle 101. The user can specifically select the real-time actual content captured in real-time or previously rendered content to be displayed on the display device(s), for example, retrieved from data store 125. For example, if autonomous vehicle 101 is traveling in a snowy day in New York City, the user can switch the display devices to display sunny environment in Hawaii as if autonomous vehicle 101 was traveling on a sunny day. The content may displayed in multiple display devices (e.g., multiple windows) in a collaborated or coordinated manner, i.e., virtual reality manner.

According to one embodiment, instead of rendering content locally, autonomous vehicle 101 includes communication module 124 to communicate with server 102 using a variety of communication protocols over network 103. The content rendering may be performed at server 102 using a much higher processing power or more processing resources available at server 102. In this example, some or all of the functionalities of content rendering system 122A may be implemented at server 102, for example, as part of content rendering system 122B. Similarly, some of all of the functionalities of trip module 121A of autonomous vehicle 101 may also be maintained in server 102, for example, as part of trip module 121B. In addition, server 102 may be communicatively coupled to multiple cloud computing nodes or cloud processing nodes to distribute the rendering tasks in a distributed fashion. Further, according to another embodiment, certain functionalities of a content rendering system may be split between content rendering systems 122A-122B of autonomous vehicle 101 and server 102.

The rendered content (e.g., virtual reality content) may be then streamed from server 102 to autonomous vehicle 101 dynamically, which may also be buffered or cached in data store 125 for better performance. The virtual reality content may further be augmented with certain content (e.g., sponsored content, advertisements), which may be identified and selected based on other information in context with respect to the real-time vehicle information (e.g., location and route, MPOI, traffic condition) and user profile 132 of a user ridding autonomous vehicle 101. Thus, the rendered content can be pure virtual reality content based on previously compiled media content. Alternatively, the content can be augmented virtual reality (AVR, also referred to as augmented reality/virtual reality or AR/VR content) content rendered based on images or video captured at real-time using cameras of autonomous vehicle 101 augmented with other content (e.g., sponsored content, complemented or related content obtained from other data sources or content providers). The augmentation can also be performed on the previously compiled content. For example, sponsored content (e.g., Ads) may be augmented onto an existing image or video that has been previously collected.

Figure 2:
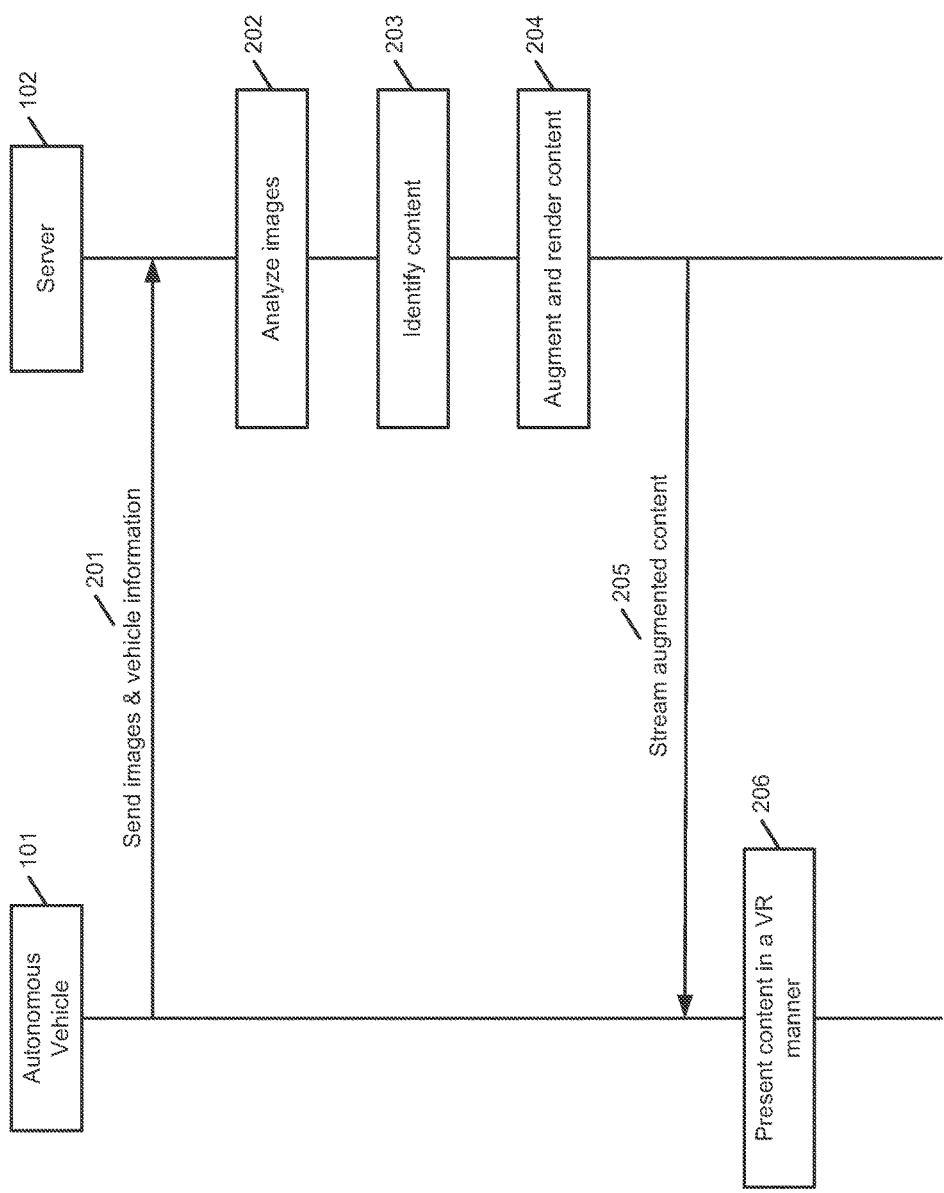
FIG. 2 is a diagram illustrating a processing flow of providing entertainment content in an autonomous vehicle according to one embodiment of the invention.

FIG. 2 is a diagram illustrating a processing flow of providing entertainment content in an autonomous vehicle according to one embodiment of the invention. Process 200 may be performed by system 100 of FIG. 1. Referring to FIG. 2, autonomous vehicle 101 sends a request for content delivery to cloud server 102 via path 201. The request may request for virtual reality content or augmented virtual reality content. When requesting regular virtual reality content, the request may simply include a vehicle ID identifying autonomous vehicle 101, a user ID identifying a user riding the autonomous vehicle, and optional content ID identifying particular content that may be selected by the user. When requesting augmented virtual reality content, the request may further includes an image or images captured by one or more cameras of autonomous vehicle 101 in real-time. The image or images may represent surroundings of autonomous vehicle 101. The request may further include vehicle information of autonomous vehicle 101, such as, for example, location and route information, speed, moving direction, etc.

In response to the request, at block 202, server 102 performs a vision analysis on the image or images to determine 3D positioning or viewing information. This operation is performed only if the request received is to request augmented reality content. At block 203, server 102 searches and identifies additional content based on some or all of the information available at server 102, such as, for example, vehicle information, MPOI information, real-time traffic information, and/or a user profile of the user. At block 204, the virtual reality content is rendered, either being regular virtual reality content or augmented virtual reality content. The rendered content is then transmitted from server 102 to autonomous vehicle 101 via path 205. The rendered content is then displayed in one or more display devices within autonomous vehicle 101 in a virtual reality manner at block 206.

Figure 3:
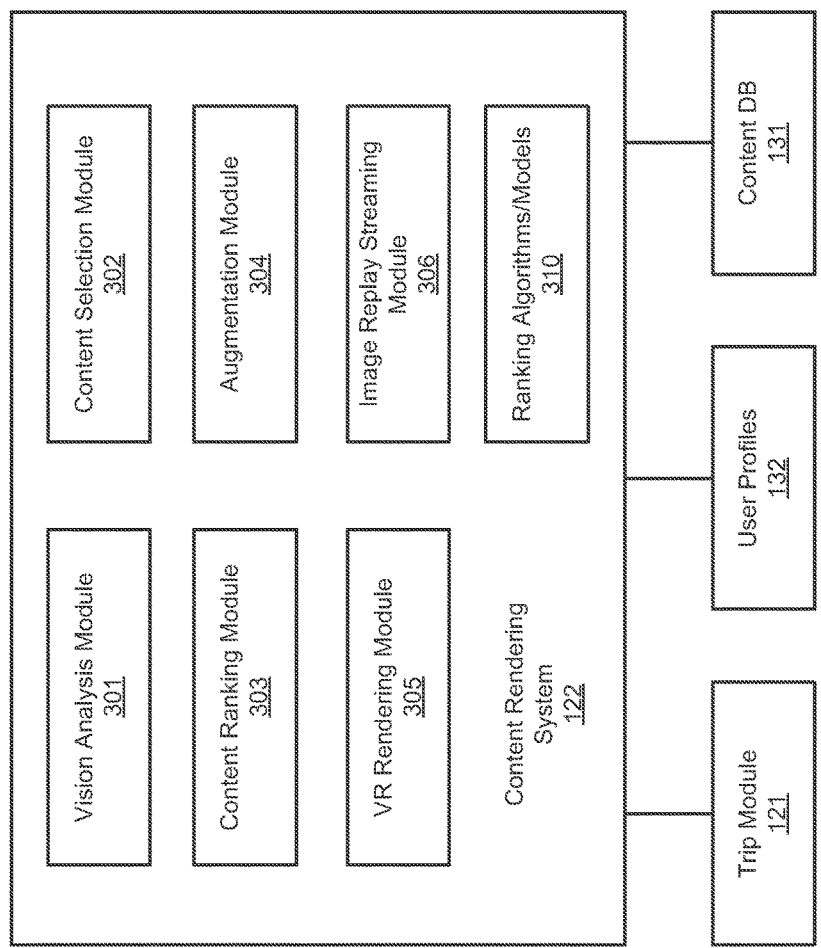
FIG. 3 is a block diagram illustrating an example of a content rendering system according to one embodiment of the invention.

FIG. 3 is a block diagram illustrating an example of a content rendering system according to one embodiment of the invention. Content rendering system 122 may represent content rendering systems 122A and/or 122B of FIG. 1. Referring to FIG. 3, content rendering system 122 includes, but is not limited to, vision analysis module 301, content selection module 302, content ranking module 303, augmentation module 304, VR rendering module 305, and image replay streaming module 306. When a request is received from an autonomous vehicle for content delivery, the request is examined to determine whether the request is to request virtual reality (VR) content or augmented virtual reality (AVR) content.

In response to determining that the request is to request AVR content, vision analysis module 301 performs a vision analysis on an image to determine 3D positioning and viewing angles information of the image. The image was captured by one or more cameras of the autonomous vehicle at real-time. The input stream to vision analysis module 301 contains the original captured images from the vehicle as well as location/orientation related information. Computer vision related core AR algorithm runs inside the vision analysis module 301 and produces 3D positioning information of the captured images, recovered based on those inputs. In other words, the outputs of vision analysis module 301 know exactly where and in which angle and how to render annotation, but just do not know what to render.

In one embodiment, content selection module 302 performs an analysis on other information such as a user ID as well as other related vehicle information. The content selection module 302 will then query user profiles 132 for user profile information (e.g. user preferences) based on the user ID, combine other related information such as maps, registered businesses, etc., which may be obtained from a variety of data sources (e.g., servers 104-106 of FIG. 1) via trip module 121, to identify a list of content items from content database 131. Content ranking module 303 ranks the content items using a variety of ranking algorithms or ranking models 310 (e.g., user preferences, prior interactive history). One of the content items is then selected based on the rankings. In other words, this output knows exactly what information to display but just don't know how to display them.

Augmentation module 304 augments the selected content item onto the actual image received from the autonomous vehicle, for example, based on the 3D positioning information provided by vision analysis module 301. VR rendering module 305 then rendering VR content based on the augmented image provided by augmentation module 304 and optionally in view of the 3D positioning/viewing information provided by vision analysis module 301. Augmentation module 304 and VR rendering module 305 may be integrated as a single module. The rendered AVR content is then streamed to the autonomous vehicle, for example, from a cloud server over a network, to be presented therein in a virtual reality manner. Note that depending on the actual setup, there could be multiple camera sensors and window monitors pairs involved and the correspondence and synchronization between captured and displayed images may need to be guaranteed for a realistic user experience.

In one embodiment, vision analysis module 301 performs an image recognition on the image and to derive or understand the content represented by the image. For example, vision analysis module 301 may derive one or more keywords describing the image or a POI. The list of content items may be identified further based on the one or more keywords or the POI represented by the image. Augmentation module 304 then augments the selected content item onto the image to generate an augmented image, where the content item may be superimposed on the image. The augmented image is then displayed on a display device of the autonomous vehicle.

For example, a camera may capture an object on the side of the road, where the object may be a building of a retail shop. The image is then analyzed and recognized in view of location and route information, MPOI information, and/or real-time traffic data of the autonomous vehicle. Other information related to the recognized retail shop, such as a user ratings of the recognized retail shop, other shops nearby, including the name or types of the shops, their user ratings, and/or the distance from the retail shop, may be obtained. The information may be annotated on the augmented image, which is then streamed back to the autonomous vehicle.

In an autonomous vehicle, there may be no actual or physical window. Rather, a "window" (referred to herein as a virtual window) may be represented or replaced by a display device, i.e., a flat or curved screen display device molded into a shape of a vehicle window. The display device would display images or stream of images (e.g., video) that are captured dynamically in real-time by appropriate camera or cameras, as if the user were watching or viewing the actual physical content through a see-through window. For each of the "windows" (e.g., display devices), there is a corresponding display channel to stream the corresponding content to be displayed at real-time, which may be centrally processed by an augmenting reality system, e.g., data processing system 110. In such situation, an augmented image is displayed in a virtual reality manner, also referred to as an augmented reality manner.

According to another embodiment, if the request is for regular virtual reality content, content selection module 302 searches and identifies a list of content items (e.g., existing video) from content database 131 based on a variety of factors, such as, current vehicle information and user profile, etc. as described above. The content items are ranked by content ranking module 303 using a variety of ranking algorithms or ranking models 310. One of the content item is selected based on the rankings. The selected content item is then rendered by VR rendering module 305. The rendered content is then replayed by image replay streaming module 306 to stream the content to the autonomous vehicle.

In one embodiment, content ranking module 303 ranks the content items in the list using a variety of ranking algorithm. The content items may be ranked based on a user profile of the user. For example, the content items may be ranked based on user preferences, which may be derived from the user profile. The user profile may be compiled based on a history of user operations of the user in the past. In one embodiment, content ranking module 303 applies one or more content ranking models 310 to each of the content items to determine a ranking score for each content item. A content item having a ranking score that is above a predetermined threshold may be selected. Content ranking models 310 may be trained using sets of known features representing similar traveling environments or traffic conditions in the past. Content ranking models 310 may also be trained based on user profiles of similar users.

In a VR configuration, there is no dependency on camera inputs at all and even if AR based annotation is still needed, only user ID and vehicle information are sent from the autonomous vehicle to the cloud server over a network. The image to be displayed on the vehicle is directly retrieved from the replay image database on the cloud server, which depending on the user preference, may or may not has anything to do with the vehicle's surrounding reality. If AR annotation is desired, the VR rendering module 305 on the cloud server will also retrieve 3D pose information for each replay image, and query the user profile using user's ID for related information such as user's service preference. Finally AR annotations particularly for the current user are rendered on top of the image according to its 3D position and the rendered image is sent back to vehicle for display on the appropriate side of monitor through communication module. The sources of replay media content could be either commercial content provider or the user's own recording of his/her previous trips. Either way, proper audio recording and replay could be a great addition to enhance the overall user VR experience.

Figure 4:
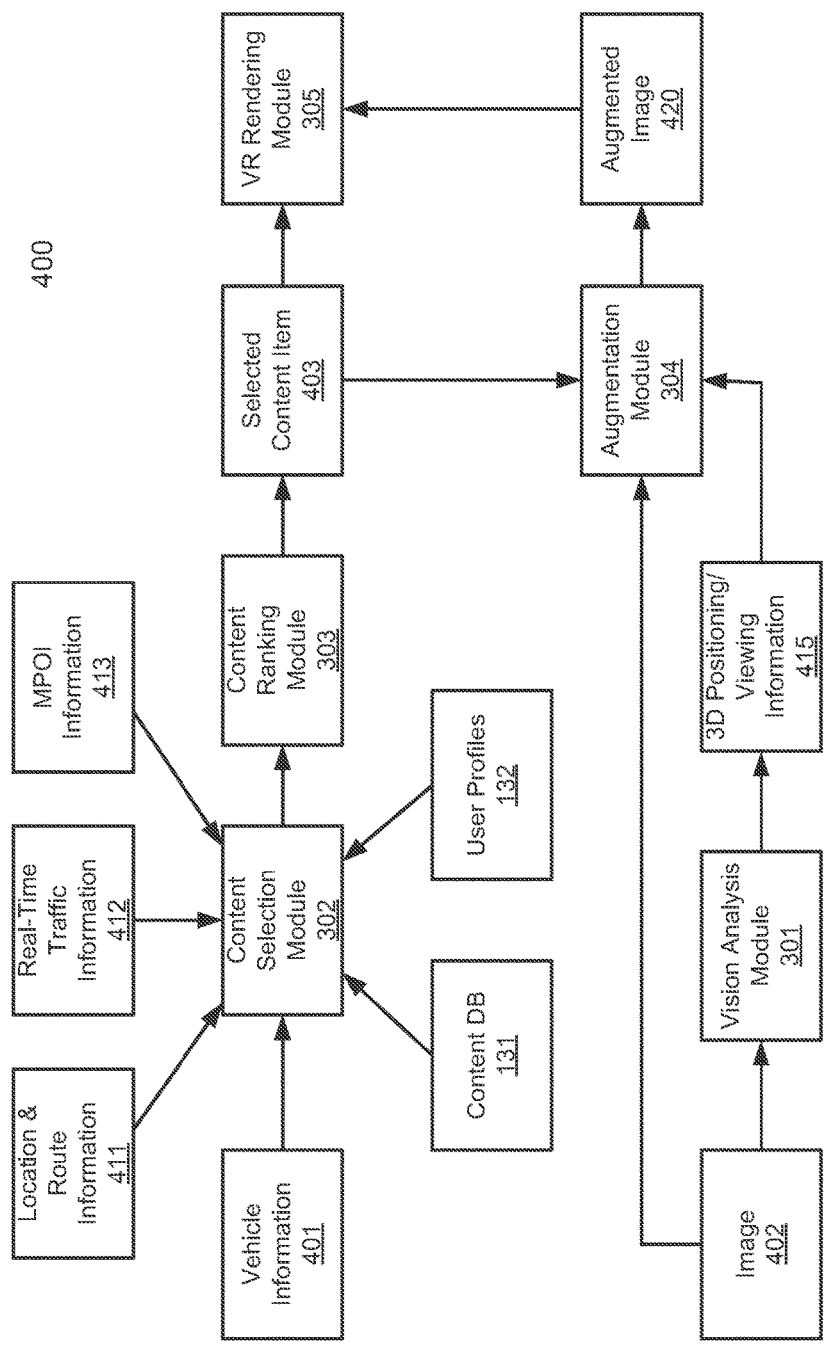
FIG. 4 is a diagram illustrating a processing flow of processing content according to one embodiment of the invention.

FIG. 4 is a diagram illustrating a processing flow of processing content according to one embodiment of the invention. Process flow 400 may be performed by data processing system 110 or server 102 of FIG. 1. Referring to FIG. 4, vehicle information 401 obtained from the autonomous vehicle is provided to content selection module 302. Based on the vehicle information 401 and other information (e.g., location and route information 411, real-time traffic information 412, MPOI information 413, user profile 132), content selection module 302 searches and identifies a list of content items from content database 131. The content items are ranked by content ranking module 303 and content item 403 is selected based on the rankings. If the request received from the autonomous vehicle is for virtual reality content, the selected content item 403 is then rendered by VR rendering module 305 and streamed back to the autonomous vehicle.

If the request is for augmented virtual reality content, an image that was captured by a camera of the autonomous vehicle in real-time is analyzed by vision analysis module 301 to determine 3D position or viewing angle information 415. Augmentation module 304 augments selected content item (e.g., sponsored content or advertisement) 403 onto image 402 based on 3D positioning/viewing information 415 to generate augmented image 420. Augmented image 420 is then rendered by VR rendering module 305 and transmitted back to the autonomous vehicle to be presented therein.

Figure 5:
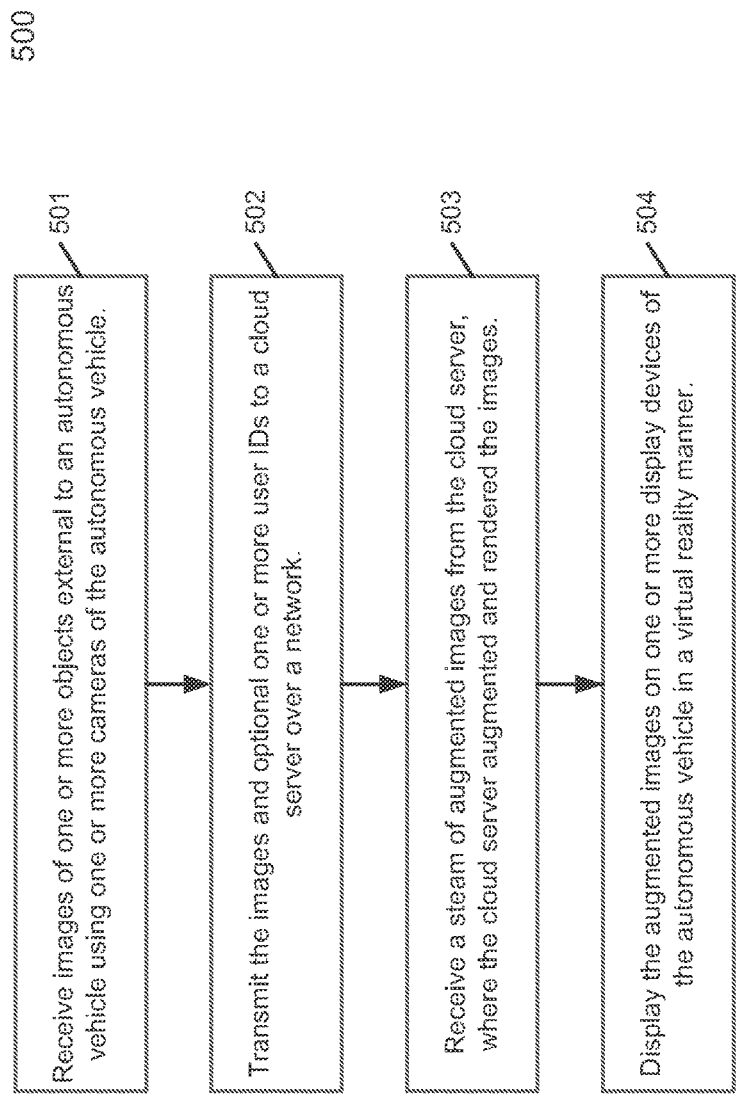
FIG. 5 is a flow diagram illustrating a process of processing content for an autonomous vehicle according to one embodiment of the invention.

FIG. 5 is a flow diagram illustrating a process of processing content for an autonomous vehicle according to one embodiment of the invention. Process 500 may be performed by processing logic which may include software, hardware, or a combination thereof. For example, process 500 may be performed by data processing system 110 of FIG. 1. Referring to FIG. 5, at block 501, processing logic receives a stream of images representing one or more objects (e.g., buildings, signs) external to an autonomous vehicle using one or more cameras of the autonomous vehicle. At block 502, processing logic transmits the images to a cloud server over a network, optionally including one or more user IDs of one or more users riding the autonomous vehicle.

At block 503, processing logic receives a stream of augmented images from the cloud server. The augmented images are processed, augmented, and rendered by the cloud server based on the images sent to the cloud server. At block 504, the augmented images are displayed on one or more display devices of the autonomous vehicle in a virtual reality manner. Some of the augmented images may be displayed on a display device that is common to all users, while other augmented images may be streamed to a private display device (e.g., mobile phones, tablets) of individual users. The private display devices may be communicatively coupled to the autonomous vehicle via a wireless local area network. Some content may deem to be private content, which is identified based on a user profile of a particular user, while other content is commonly interesting to all users riding the autonomous vehicle.

Figure 6:
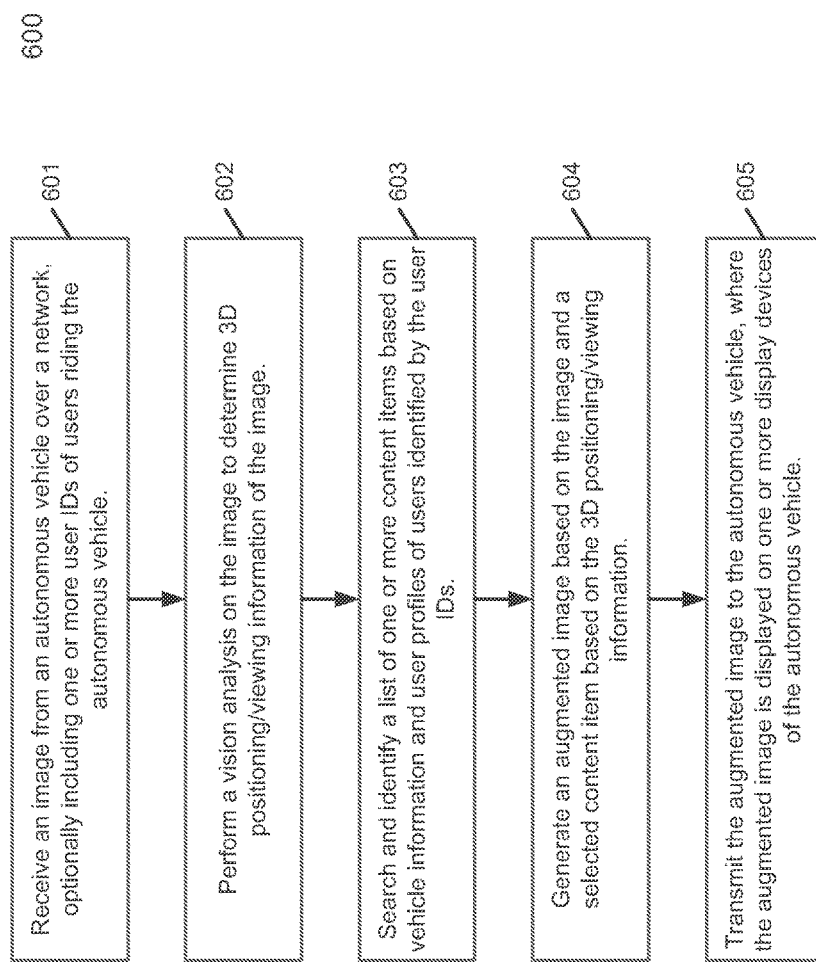
FIG. 6 is a flow diagram illustrating a process of processing content for an autonomous vehicle according to another embodiment of the invention.

FIG. 6 is a flow diagram illustrating a process of processing content for an autonomous vehicle according to another embodiment of the invention. Process 600 may be performed by processing logic which may include software, hardware, or a combination thereof. For example, process 600 may be performed by server 102 of FIG. 1. Referring to FIG. 6, at block 601, processing logic receives an image from an autonomous vehicle over a network, as well as one or more user IDs (optional) of users riding the autonomous vehicle. At block 602, processing logic performs a vision analysis on the image to determine 3D positioning or viewing information. At block 603, processing logic searches and identifies a list of content items based on vehicle information (e.g., location and route, MPOI, real-time traffic data) and user profiles of the users. The content items may be ranked using a ranking algorithm or ranking model. One of the content items is selected based on the rankings. At block 604, processing logic augments the selected content item onto the image and generates an augmented virtual reality image based on the 3D positioning/viewing information. At block 605, the augmented image is transmitted to the autonomous vehicle to be presented therein in a virtual reality manner.

The techniques described throughout this application can be used to provide certain sponsored content, such as advertisements or Ads, to a user riding in an autonomous vehicle, based on the traveling environment at the point in time along a route of a trip (e.g., location and route information, real-time traffic condition, map and point of interests). The sponsored content can also be augmented onto an image or images captured at real-time of the autonomous vehicle's surroundings, creating an augment-reality content delivery environment.

An autonomous vehicle described above refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller use the detected information to navigate through the environment. The sensor system may include one or more cameras, a microphone, a global positioning system (GPS), an internal measurement unit (IMU), a radar system, and/or a light detection and range (LIDAR) system.

A GPS system may estimate a geographic location of the autonomous vehicle. The GPS system may include a transceiver operable to provide information regarding the position of the autonomous vehicle. An IMU unit may sense position and orientation changes of the autonomous vehicle based on inertial acceleration. A radar unit may represent a system that utilizes radio signals to sense objects within the local environment of the autonomous vehicle. In some embodiments, in addition to sensing objects, the radar unit may additionally sense the speed and/or heading of the objects. A LIDAR unit may sense objects in the environment in which the autonomous vehicle is located using lasers. The LIDAR unit could include one or more laser sources, a laser scanner, and one or more detectors, among other system components. A camera may include one or more devices capture images of the environment surrounding the autonomous vehicle. The camera may be a still camera or a video camera. A camera may be mechanically movable such as by rotating and/or tilting a platform to which the camera is mounted. A microphone may be configured to capture sound from the environment surrounding the autonomous vehicle.

An autonomous vehicle may further include a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, estimate the speed of objects, etc.

An autonomous vehicle may further include a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via a user interface. The navigation system may update the driving path dynamically while the autonomous vehicle is in operation. The navigation system can incorporate data from a GPS system and one or more maps so as to determine the driving path for the autonomous vehicle.

An autonomous vehicle may further include a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in a control system to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

An autonomous vehicle may further include a wireless communication system to allow communication between the autonomous vehicle and external systems, such as devices, sensors, other vehicles, etc. within its surrounding environment and/or controllers, servers, etc., which can provide useful information regarding the vehicle's surroundings, such as traffic information, weather information, etc. For example, the wireless communication system can wirelessly communicate with one or more devices directly or via a communication network. The wireless communication system can use any cellular communication network or a wireless local area network (WLAN), e.g., using WiFi. The wireless communication system could communicate directly with a device, for example, using an infrared link, Bluetooth, etc.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 7:
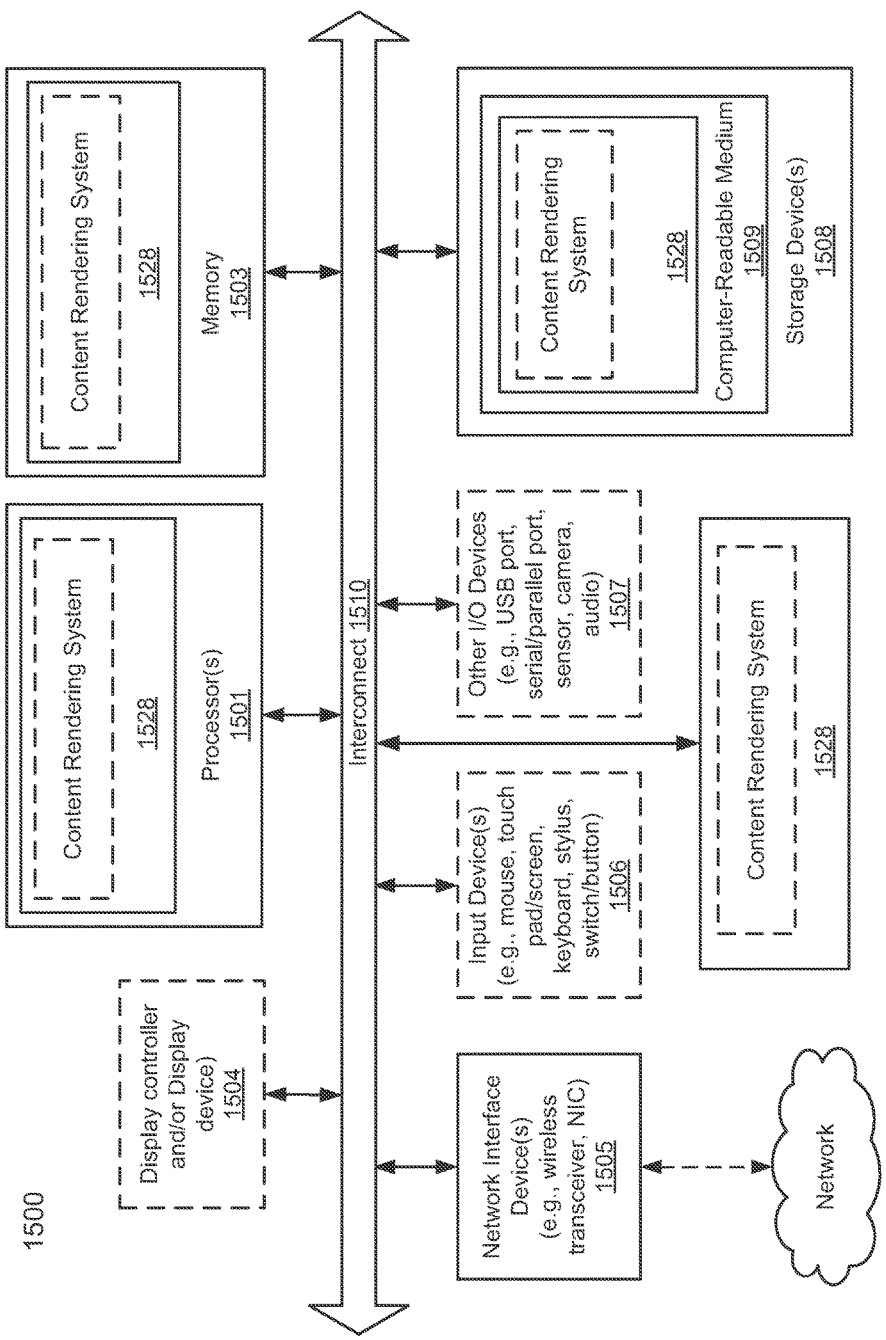
FIG. 7 is a block diagram illustrating a data processing system according to one embodiment.

FIG. 7 is a block diagram illustrating an example of a data processing system which may be used with one embodiment of the invention. For example, system 1500 may represents any of data processing systems described above performing any of the processes or methods described above, such as, for example, data processing system 110 or server 102 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein.

Module/unit/logic 1528 may represent any of the components described above, such as, for example, a search engine, an encoder, an interaction logging module as described above. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for content delivery to autonomous vehicles, the method comprising:

receiving at a server a request from a first autonomous vehicle for content delivery over a network, the request including an image that was captured by a camera of the first autonomous vehicle while the first autonomous vehicle was driving on a road, the image capturing an object external to the first autonomous vehicle;

in response to the request, performing a vision analysis on an image obtained from the request to determine three-dimensional (3D) positioning information of the image, including determining a position of the object within the image and a viewing angle of the object with respect to a location of the camera;

identifying a list of a plurality of content items to augment based on current vehicle information of the first autonomous vehicle in view of one or more user profiles of one or more users to be entertained while riding the first autonomous vehicle;

augmenting a first content item selected based on user preferences from the list of content items onto the image by superimposing the first content item onto the image based on the position and viewing angle of the object to generate an augmented image, wherein the first content item includes a content item previously cached by a content database maintained by the autonomous vehicle; and transmitting the augmented image to the first autonomous vehicle over the network, wherein the augmented image is to be displayed on a display device within the autonomous vehicle in a virtual reality manner.

2. The method of claim 1, wherein the server provides content delivery to a plurality of autonomous vehicle over the network.

3. The method of claim 1, wherein the image was captured in real-time by one or more cameras of the first autonomous vehicle representing a surrounding view of the first autonomous vehicle.

4. The method of claim 3, wherein the image is one of a plurality of images streamed in sequence from the first autonomous vehicle, and wherein the augmented image is one of a plurality of augmented images streamed from the server to the first autonomous vehicle.

5. The method of claim 1, wherein the current vehicle information includes location information of the first autonomous vehicle obtained from the request.

6. The method of claim 1, wherein the selected content item is selected from the list of content items based on a user preference determined based on the user profile, wherein the user profile is retrieved based on a user identifier obtained from the request.

7. The method of claim 1, further comprising performing an image recognition on the image to recognize a first object external to the autonomous vehicle, wherein the content item augmented onto the image includes first metadata describing the first object.

8. The method of claim 7, wherein the content item further includes second metadata describing a second object nearby, including indicating a distance between the first object and the second object.

9. The method of claim 8, wherein the second object is not shown in the image, but is within a predetermined proximity of the first autonomous vehicle based on map and point of interest (MPOI) information obtained based on location and route information of the first autonomous vehicle.

10. A non-transitory machine-readable medium having instructions stored therein, which when executed by a processor, cause the processor to perform operations of content delivery to autonomous vehicles, the operations comprising:

receiving a request from a first autonomous vehicle for content delivery over a network, the request including an image that was captured by a camera of the first autonomous vehicle while the first autonomous vehicle was driving on a road, the image capturing an object external to the first autonomous vehicle;

in response to the request, performing a vision analysis on an image obtained from the request to determine three-dimensional (3D) positioning information of the image, including determining a position of the object within the image and a viewing angle of the object with respect to a location of the camera;

identifying a list of a plurality of content items to augment based on current vehicle information of the first autonomous vehicle in view of one or more user profiles of a one or more users to be entertained while riding the first autonomous vehicle;

augmenting a first content item selected based on user preferences from the list of content items onto the image by superimposing the first content item onto the image based on the position and viewing angle of the object to generate an augmented image, wherein the first content item includes a content item previously cached by a content database maintained by the autonomous vehicle; and transmitting the augmented image to the first autonomous vehicle over the network, wherein the augmented image is to be displayed on a display device within the autonomous vehicle in a virtual reality manner.

11. The non-transitory machine-readable medium of claim 10, wherein the server provides content delivery to a plurality of autonomous vehicle over the network.

12. The non-transitory machine-readable medium of claim 10, wherein the image was captured in real-time by one or more cameras of the first autonomous vehicle representing a surrounding view of the first autonomous vehicle.

13. The non-transitory machine-readable medium of claim 12, wherein the image is one of a plurality of images streamed in sequence from the first autonomous vehicle, and wherein the augmented image is one of a plurality of augmented images streamed from the server to the first autonomous vehicle.

14. The non-transitory machine-readable medium of claim 10, wherein the vehicle information includes location information of the first autonomous vehicle obtained from the request.

15. The non-transitory machine-readable medium of claim 10, wherein the selected content item is selected from the list of content items based on a user preference determined based on the user profile, wherein the user profile is retrieved based on a user identifier obtained from the request.

16. The non-transitory machine-readable medium of claim 10, wherein the operations further comprise performing an image recognition on the image to recognize a first object external to the autonomous vehicle, wherein the content item augmented onto the image includes first metadata describing the first object.

17. The non-transitory machine-readable medium of claim 16, wherein the content item further includes second metadata describing a second object nearby, including indicating a distance between the first object and the second object.

18. The non-transitory machine-readable medium of claim 17, wherein the second object is not shown in the image, but is within a predetermined proximity of the first autonomous vehicle based on map and point of interest (MPOI) information obtained based on location and route information of the first autonomous vehicle.

19. A data processing system operating as a server, comprising:

a processor; and a memory coupled to the processor to store instructions, which when executed by the processor, cause the processor to perform operations, the operations including receiving a request from a first autonomous vehicle for content delivery over a network, the request including an image that was captured by a camera of the first autonomous vehicle while the first autonomous vehicle was driving on a road, the image capturing an object external to the first autonomous vehicle;

in response to the request, performing a vision analysis on an image obtained from the request to determine three-dimensional (3D) positioning information of the image, including determining a position of the object within the image and a viewing angle of the object with respect to a location of the camera, identifying a list of a plurality of content items to augment based on current vehicle information of the first autonomous vehicle in view of one or Wore user profiles of one or more users to be entertained while riding the first autonomous vehicle, augmenting a first content item selected based on user preferences from the list of content items onto the image by superimposing the first content item onto the image based on the position and viewing angle of the object to generate an augmented image, wherein the first content item includes a content item previously cached by a content database maintained by the autonomous vehicle, and transmitting the augmented image to the first autonomous vehicle over the network, wherein the augmented image is to be displayed on a display device within the autonomous vehicle in a virtual reality manner.

20. The system of claim 19, wherein the server provides content delivery to a plurality of autonomous vehicle over the network.

21. The system of claim 18, wherein the image was captured in real-time by one or more cameras of the first autonomous vehicle representing a surrounding view of the first autonomous vehicle.

22. The system of claim 21, wherein the image is one of a plurality of images streamed in sequence from the first autonomous vehicle, and wherein the augmented image is one of a plurality of augmented images streamed from the server to the first autonomous vehicle.

23. The system of claim 18, wherein the current vehicle information includes location information of the first autonomous vehicle obtained from the request.

24. The system of claim 18, wherein the selected content item is selected from the list of content items based on a user preference determined based on the user profile, wherein the user profile is retrieved based on a user identifier obtained from the request.

25. The system of claim 18, wherein the operations further comprise performing an image recognition on the image to recognize a first object external to the autonomous vehicle, wherein the content item augmented onto the image includes first metadata describing the first object.

\* \* \* \* \*